United States Patent
Lanciaux

[19]

[11] Patent Number: 6,069,585
[45] Date of Patent: May 30, 2000

[54] PERSONAL DIRECTION FINDING APPARATUS

[75] Inventor: Jacques Lanciaux, Pibrac, France

[73] Assignee: Rockwell-Collins France, Blagnac, France

[21] Appl. No.: 09/180,611

[22] PCT Filed: May 13, 1997

[86] PCT No.: PCT/FR97/00841

§ 371 Date: Nov. 12, 1998

§ 102(e) Date: Nov. 12, 1998

[87] PCT Pub. No.: WO97/43599

PCT Pub. Date: Nov. 20, 1997

[30] Foreign Application Priority Data

May 14, 1996 [FR] France .................................. 96.05980

[51] Int. Cl.⁷ ...................................................... G01S 3/02
[52] U.S. Cl. ........................... 342/443; 342/29; 342/147;
342/195; 342/417; 342/450; 342/454; 342/455;
367/99; 367/107; 367/116; 367/124; 367/125;
367/126; 340/979; 381/300; 381/309
[58] Field of Search ................................. 367/87, 93, 94,
367/99, 101, 102, 116, 118, 124, 125, 126,
107; 342/24, 27, 28, 29, 33, 36, 41, 116,
147, 156, 175, 417, 418, 419, 420, 428,
431, 432, 440, 441, 442, 443, 450, 454,
455, 427, 192, 193, 195; 340/945, 971,
979; 381/1, 300, 309

[56] References Cited

U.S. PATENT DOCUMENTS

| | | | |
|---|---|---|---|
| 3,887,896 | 6/1975 | Ramstedt | 367/116 |
| 3,940,769 | 2/1976 | Sherman et al. | 342/427 |
| 3,987,403 | 10/1976 | Smith | 367/102 |
| 4,292,678 | 9/1981 | Kay | 367/102 |
| 4,310,903 | 1/1982 | Kay | 367/102 |
| 4,692,763 | 9/1987 | Gregg, Jr. | 342/28 |
| 4,713,669 | 12/1987 | Shuch | 342/455 |
| 4,774,515 | 9/1988 | Gehring . | |
| 5,334,987 | 8/1994 | Teach . | |
| 5,905,464 | 5/1999 | Lanciaux | 342/443 |

FOREIGN PATENT DOCUMENTS

| | | |
|---|---|---|
| 503214 | 9/1992 | European Pat. Off. . |
| 2731521 | 9/1996 | France . |

OTHER PUBLICATIONS

English Abstract of Japanese Patent Application 7–057190, No Date.

English Abstract of Japanese Patent Application 1–077296, No Date.

*Primary Examiner*—Bernarr E. Gregory
*Attorney, Agent, or Firm*—Young & Thompson

[57] ABSTRACT

A personal direction finding apparatus for determining the direction to be followed in order to reach a predetermined spot which includes a headset provided with two earphones and a circuit for generating a track error signal. The circuit includes a compass supported on the headset for outputting a heading signal corresponding to the heading of the direction of travel, a receiver for a position location and navigation system outputting a signal for the heading to be followed via one output, and a track error computing circuit.

10 Claims, 1 Drawing Sheet

PERSONAL DIRECTION FINDING APPARATUS

BACKGROUND OF THE INVENTION

The present invention relates to a personal direction-finding apparatus making it possible to determine a direction to follow in order to reach a predetermined spot, either in a straight line or by following a predefined path.

To find their way on land, sea or in the air, individuals travelling either on foot or on board a vehicle usually use traditional direction-finding means such as the compass or the satellite navigation system also known as GPS. These means require the frequent reading of the information delivered in order to correct the drift from the path or track error and consequently, during each period of reading, the eyes are no longer available for progressing, observing to noting visual landmarks. In the case of a pedestrian, reading of the information further requires that the pedestrian holds the direction-finding apparatus in order to place it in front of his eyes.

French Patent FR-A-2 731 521 describes an individual goniometric apparatus comprising a means for picking up the radiation of a source, worn on the user's head, a receiver possibly intervening as demodulator, a circuit for processing the goniometric signal and at least one earphone connected to the output of the processing circuit.

Document "Patent Abstract of Japan" Vol. 95 No. 003 discloses a vocal nagivation device comprising a sensor of the position or of the angle of rotation of a pivoting wheel of a vehicle and furnishing auditive data servo-controlled by this orientation.

U.S. Pat. No. 5,334,987 discloses a control system of an aircraft comprising a GPS receiver making it possible to determine the position of the aircraft, and a computer producing a flight plan having the desired orientation to direct the pilot towards the zone that he must reach.

U.S. Pat. No. 4,774,515 discloses an attitude indicator comprising a headset with earphones to furnish an individual with data relative to his position in space.

BRIEF SUMMARY OF THE INVENTION

An object of the present invention is to provide a personal direction-finding apparatus which is convenient to use, allowing the wearer to be permanently informed as to the track to be followed without his eyes and hands having to intervene.

To that end, this personal direction-finding apparatus for determining a direction to be followed in order to reach a predetermined spot either in a straight line or by following a predefined path comprises a headset provided with two left and right earphones applied on the ears of the user of the apparatus, to allow a binaural listening of sound signals, a circuit generating a track error signal which represents the angular deviation between the direction to be followed and the direction effectively followed by the user of the apparatus, a generator of a low-frequency electric signal in the spectrum of audible frequencies by the human ear, and a circuit for processing the binaural sounds which has inputs connected to the output of the track error signal generating circuit and to the output of the low-frequency signal generator, and having two outputs respectively connected to the two earphones, in order to produce sound signals differentiated for the left and right ears as a function of the track error signal and to furnish, when the user stops and/or is moving, a servo-controlled sound signal perceived by the user as seeming to come from a point located in the direction to be followed, characterized in that the track error signal generating circuit comprises a magnetic compass, borne by the headset, outputting a magnetic heading signal corresponding to the magnetic heading of the direction followed, a receiver of a position location and navigation system outputting a heading signal to be followed and a track error computing circuit having a first input connected to the magnetic compass and a second input connected to the receiver and effecting a subtraction between the heading signal to be followed and the magnetic heading signal in order to deliver the track error signal as result of the difference, this signal being applied to the output of the track error signal generator circuit.

The track error signal generating circuit preferably comprises, in addition to the magnetic compass, a receiver of a position location and navigation system, by satellites (GPS system) or ground stations, but the apparatus may also function, in the event of necessity imposed by the environment, either with a receiver alone or with the magnetic compass alone.

If the apparatus is used in an environment allowing reception of the signals coming from satellites or ground stations and the use of the magnetic heading given by the magnetic compass, the apparatus in that case furnishes, when the user has stopped or is moving, a sound signal servo-controlled by the orientation of his head and of which the source seems to come from the direction of the point having the longitude and latitude selected in the position location receiver.

If the apparatus is used in an environment not allowing reception of the signals coming from the satellites or ground stations, for example if the user of the apparatus is moving in a subaquatic environment (diver), the navigation of a diver equipped with the apparatus is effected on the data of the magnetic heading to be followed. This data is selected on the apparatus and the latter delivers, at stop and during movement of the diver, a sound signal servo-controlled by the orientation of his head and of which the source seems to come from the direction of the heading selected.

In the case of use on the ground, a magnetic compass with two axes, analyzing the terrestrial magnetic field in the horizontal plane is sufficient. In the case of subaquatic use, a magnetic compass with three axes may allow the apparatus to function whatever the position of the diver.

If the magnetic heading data is not sufficiently reliable because of the presence of magnetic objects nearby, high voltage lines or the nature of the subsoil, the position location receiver may be used alone, taking as information the track error which it delivers. In that case, the sound signal is applied to the earphones only if the speed of displacement of the user of the apparatus is sufficient to allow the receiver to make its calculations and the sound signal is in that case not servo-controlled by the orientation of the head of the user of the apparatus, but solely by his direction of displacement.

The circuit generating the track error signal is advantageously equipped with a switch allowing the selection of one of the three possible operational modes of the apparatus, namely, the basic mode with combined intervention of the receiver and of the magnetic compass, the mode with the receiver alone active and the mode with the magnetic compass alone active. The selection of the operational mode may be effected manually or automatically. In this latter case, the apparatus may comprise a device for automatic mode switching as a function of the validity of the information issuing from the magnetic compass and the receiver. The apparatus then comprises a means intervening on the sound signal applied to the earphones in order to inform the user of the apparatus of the automatic mode change by means of a particular, identifiable sound signal.

The GPS receiver of the apparatus may be integrated in the headset or it may be constituted by an external receiver provided with a data output.

The information generally available on the GPS receivers, such as distance from the point selected, output of corridor and qualities of the reception of the satellite, may be used to inform the user of the apparatus by an appropriate signal or sound message.

The geographical coordinates of the rendez-vous or track point may be loaded in the GPS receiver either by the user himself or by a radioelectric data transmission.

The apparatus according to the present invention also makes it possible to effect homing of a radioelectric emission source of which the direction was acquired during a brief pulse.

BRIEF DESCRIPTION OF THE DRAWINGS

Various forms of embodiment of the present invention will be described hereinafter by way of non-limiting examples, with reference to the accompanying drawings, in which.

DESCRIPTION OF THE PREFERRED EMBODIMENTS

Figure 1:
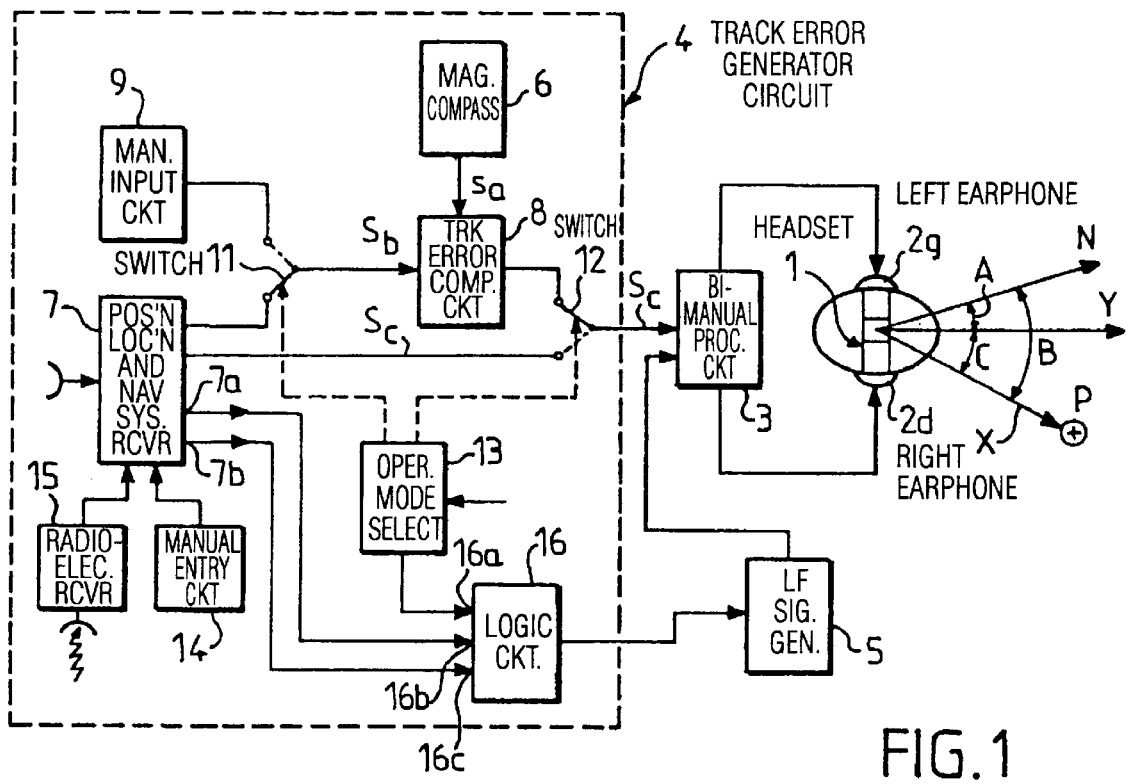
FIG. 1 is a block diagram of a personal direction-finding apparatus according to the present invention.

The apparatus according to the invention which is shown in FIG. 1 comprises a headset 1 worn on the head of the user of the apparatus and which comprises two earphones, left 2g and right 2d, applied respectively to the two ears of the user of the apparatus, in order to allow a binaural listening of sound signals. The two earphones 2g, 2d are respectively connected to two outputs of a binaural listening processing circuit 3 with two inputs. To a first input of the processing circuit 3 there is connected the output of a circuit 4 comprising all the components located inside a rectangle traced in broken lines. This circuit 4 is intended to produce a track error signal $s_c$ which represents the angular deviation C between a direction X having to be followed by the user to reach a rendez-vous point P and the direction Y effectively followed by the user. The direction Y followed by the user is characterized by its magnetic heading A, i.e. the angle formed by this direction Y with the direction N of the magnetic North. The direction X to be followed towards the rendez-vous point P is characterized by the fixing of the rendez-vous point, i.e. the angle B formed by the direction X with the direction N of the magnetic North.

The apparatus also comprises a low-frequency electric signal generator 5 which is connected to the second input of the binaural listening processing circuit 3. This low-frequency signal generator emits a signal in the spectrum of the frequencies audible by the human ear.

In the binaural listening processing circuit 3, the low-frequency signal of the generator 5 is modified, as a function of the value of the track error signal $s_c$, so as to produce at the two outputs of the processing circuit 3, signals which are differentiated concerning their amplitude, their phase, and the frequency response, which are translated, in the ear-phones 2g and 2d, by differentiated sound signals applied to the right and left ears. The synthesis of the differentiated sound signals is translated, for the user of the apparatus, by an auditive perception as if the rendez-vous point P constituted the source of sound of the signals. The user of the apparatus may therefore be permanently oriented, whatever the nature of the terrain or the environment in which he is moving, towards the rendez-vous point P, thanks to his automatic guiding towards the "fictitious" sound emission source P.

The principal elements constituting the circuit 4 generating the track error signal will now be described in greater detail. The two principal constituents of the circuit 4 are a magnetic compass 6 and a receiver 7 of a position location and navigation system by satellites or ground stations, referred to hereinafter, for simplification, as GPS receiver. The magnetic compass 6, borne by the headset 1, permanently outputs a signals $S_a$ corresponding to the magnetic heading A, i.e. which is a function of the orientation of the headset 1, therefore of the user's head. The output of the magnetic compass 6 is connected to a first input of a track error computing circuit 8. This circuit comprises a second input to which is applied a heading signal $S_b$ to be followed representing the heading B, i.e. the angle of the direction X with the direction N of the magnetic North. This signal is furnished either from the GPS receiver 7 or from a manual input circuit 9, circuit in which the user may himself enter the geographical coordinates of the rendezvous point P in order correlatively to deliver a heading signal $S_b$ to be followed. The selection of the source of the heading signal $S_b$ to be followed is effected by means of a switch 11 connected between the outputs of the GPS receiver 7 and the manual input circuit 9 and the second input of the computing circuit 8.

The GPS receiver 7 also delivers, on another of its outputs, the track error signal $S_c$ which is used when the magnetic heading data is not sufficiently reliable, as will be specified hereinafter. This output may be connected directly to the first input of the binaural listening processing circuit 3, by means of a second switch 12 which is connected between, on the one hand, the output of the GPS receiver 7 and the output of the computing circuit 8 and, on the other hand, the first input of the processing circuit 3.

The two switches 11 and 12 are controlled by an operational mode selector 13 which is manually controlled by the user or automatically as a function of the validity of the information issuing from the magnetic compass 6 and from the GPS receiver 7.

If the apparatus is used in an environment allowing the reception of the GPS signals coming from satellites and the use of the magnetic heading A, i.e. if the information issuing from the GPS receiver 7 and from the magnetic compass 6 is valid, the switches 11 and 12 are each placed in a first position, as shown in solid lines in FIG. 1. In that case, the second input of the computing circuit 8 is connected, by switch 11, to the output of the GPS receiver 7 so as to receive therefrom the heading signal $S_b$ to be followed and its output is connected, by switch 12, to the first input of the processing circuit 3. The computing circuit 8 is a circuit for subtraction between the signals $S_b$ and $S_a$, so as to deliver the track error signal $S_c$ as result of their difference. In other words, the circuit 8 effects the calculation $S_c=S_b-S_a$. In this first operational mode which is the basic operational mode and which is generally used, the apparatus furnishes, when the user has stopped and when he is moving, a sound signal which is servo-controlled by the orientation of the head and of which the source seems to come from the direction of the point P of which the longitude and latitude are selected in the GPS receiver 7.

If the apparatus is used in an environment not allowing reception of the GPS signals coming from the satellites, for example if the user (diver) is moving in a subaquatic environment, his navigation may be effected on the data of the heading to be followed, B, entered manually by the user in the circuit 9. In that case, the switch 11 is placed in its second position so as to connect the output of the manual input circuit 9 to the second input of the computing circuit 8. There again, in this second operational mode, with the use of the magnetic compass 6 alone, the apparatus delivers, at rest and in the course of displacement, a sound signal servo-controlled by the orientation of the head and of which the source seems to come from the direction X of the selected heading B.

If the magnetic heading data A is not sufficiently reliable, the apparatus may be used, in a third operational mode, by using solely the GPS receiver 7. In that case, the switch 12 is placed in its second position in which it connects the output of the GPS receiver 7 delivering the track error signal $S_c$ directly to the first input of the processing circuit 3. In that case, the sound signal is not applied to the earphones 2g, 2d if the speed of displacement of the user is too low to allow the GPS receiver 7 to effect its calculations and the information is not servo-controlled by the orientation of the head but solely by the direction of displacement of the user.

The circuit 4 generating the track error signal $s_c$ comprises several other functional elements. To the GPS receiver 7 there are connected a circuit 14 allowing manual input, to the GPS receiver 7, of the geographical coordinates of the track or rendez-vous point P, and a radioelectric receiver 15 allowing a downloading of the geographical coordinates of the track point via a radioelectric data transmission.

The circuit 4 may also comprise a control logic circuit 16 with a plurality of inputs and having the output connected to the low-frequency signal generator 5. A first input 16a of the control logic 16 is connected to the mode selector 13 so as to provoke, during an automatic change of operational mode, the emission, by the low-frequency signal generator 5, of a signal characterizing the change of mode. A second input 16b of the control logic 16 is connected to an output 7a of the receiver 7 emitting a signal characterizing the present state of the GPS receiver 7. A third input 16c of the control logic 16 is connected to a second output 7b of the GPS receiver 7 delivering a signal representing the distance from the rendezvous point P. The signals applied to the inputs 16b and 16c of the control logic 16 are used to control the low-frequency signal generator 5 so that the latter emits different types of sounds and/or messages as a function of the states of the GPS receiver 7, for example depending on whether the user is located in a predetermined corridor or outside of this corridor, and of the distance from the rendezvous point P selected.

Figure 2:
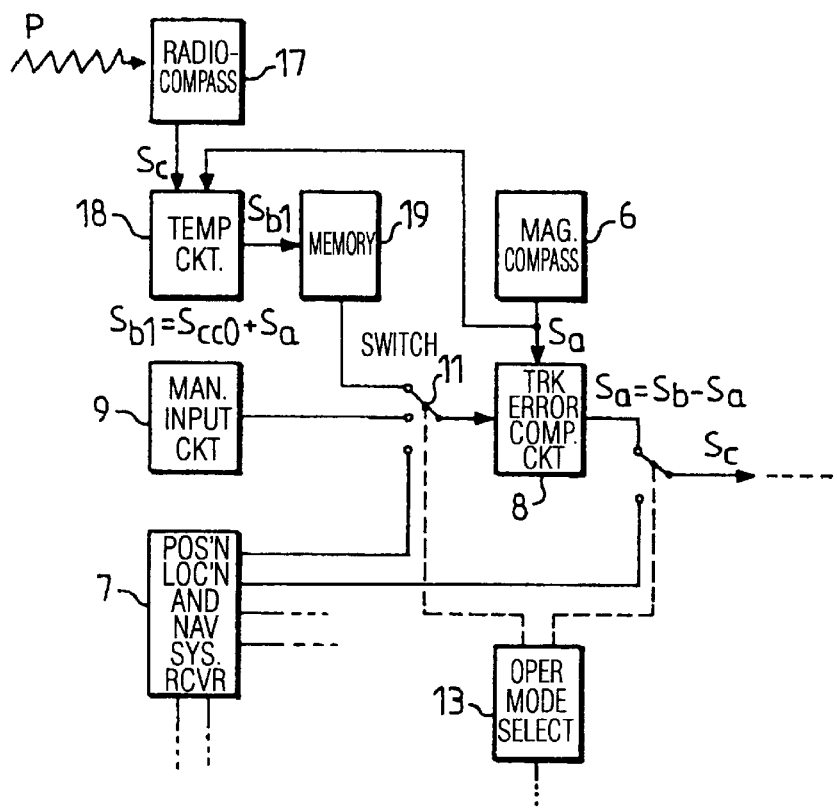
FIG. 2 is a block diagram of a variant embodiment of the circuit generating the track error signal.

FIG. 2 shows a variant embodiment making it possible to effect a homing of a point P constituted by a radioelectric emission source periodically emitting a brief signal followed by a long period of silence. In this case, a radiocompass 17, worn on the user's head, makes it possible to detect, at instant t0, the brief radioelectric signal emitted by the source P and to determine the direction of the source P with respect to the orientation of the head, this direction being characterized by the signal $S_{cr0}$ emitted by the radiocompass 17. Simultaneously, the magnetic compass 6 furnishes an indication of the magnetic heading $S_a$ of the orientation of the head Y at instant t0. A computing circuit 18 establishes the fixing $S_{b1}$ of the source P at instant $t_0$, by effecting the addition $S_{bl}=S_{cr0}+S_a$. The output of circuit 18 is connected to a memory 19 which stores the value $S_{bl}$. After storing this initial information, the user may continue to orient towards the source P, although the latter has ceased its emission. To that end, the signal $S_b$ at the output of the memory 19 is directed by the switch 11, in that case placed in a third position, towards the second input of the track error computing circuit 8. The circuit 8 then effects the calculation of the track error $S_c$ by the following operation: $S_c=S_b-S_a$. The value of the corresponding track error signal is applied to the processing circuit 3 to allow the user to continue to head towards the source P, although the latter is silent.

The personal direction-finding apparatus according to the present invention may be used in various ways. For example, the user may wish to be able to advance in a determined corridor. In that case, the user, after having entered the geographical coordinates of the track point to be reached by means of the circuit 14 or 15, places the GPS receiver 7 in the "corridor" mode. The apparatus itself then makes it possible to advance in a corridor of defined width, by following the sound guiding.

In the case of advance in a hostile environment, the user's hands and eyes are 100% available to ensure safety of the advance and, in order to conserve the availability of hearing, the "corridor alert" mode of the GPS receiver 7 is triggered off. The sound signals are then applied by the earphones 2d, 2g only in the event of excessive deviation with respect to the ideal track.

As has already been indicated, the apparatus also allows the homing of a correspondent by radioelectric means. The geographical coordinates of the correspondent are transmitted radioelectrically, these coordinates are received in the receiver 15 and automatically loaded in the correspondent's GPS receiver in order to allow homing.

The user may also use the apparatus as "Ariadne's clue". To that end, he places the GPS receiver 7 in automatic point recordal mode and when he so desires, he can thus return to the starting point with the aid of the sound guiding, by selecting the "return" mode on the GPS receiver 7.

In the case of use by a diver in a subaquatic environment, the diver may make the precise acquisition of the track to be followed, by means of the gps receiver 7, by surfacing, and he can continue his route submerged, using only the heading information furnished by the magnetic compass 6.

What is claimed is:

1. Personal direction-finding apparatus for determining a direction to be followed in order to reach a predetermined spot either in a straight line or by following a predefined path, comprising a headset (1) provided with left (2g) and right (2d) earphones for binaural monitoring of sound signals, a circuit (4) generating a track error signal ($S_c$), representing an angular deviation (C) between a direction (X) to be followed and a direction (Y) effectively followed by a user of the apparatus, a generator of a low-frequency electric signal (5) in a spectrum of audible frequencies and a processing circuit (3) having first and second inputs, respectively connected to an output of the track error signal generating circuit (4) and to an output of the low-frequency signal generator (5), and having two outputs respectively connected to the two earphones (2g,2d), in order to produce sound signals differentiated for the left and right earphones as a function of the track error signal ($S_c$) and to furnish a sound signal perceived by the user as seeming to come from a point located in the direction (X) to be followed, wherein the circuit (4) generating the track error signal ($S_c$) comprises a magnetic compass (6), borne by the headset (1), outputting a first magnetic heading signal ($S_a$) corresponding to a magnetic heading (A) of the direction (Y) effectively followed, a receiver of a position location and navigation system (7) outputting a second heading signal ($S_b$) to be followed representing a heading of the direction (X) to be followed and a track error computing circuit (8) having a first input connected to the magnetic compass (6) and a second input connected to the receiver (7) and effecting a subtraction between the second heading signal ($S_b$) to be followed and the first magnetic heading signal ($S_a$) in order to deliver the track error signal ($S_c$) as a result of the difference, the track error signal being applied to the output of the track error signal generator circuit (4).

2. Apparatus according to claim 1, further comprising:

a manual input circuit (9) to enter geographical coordinates of a rendezvous point (P) in order to deliver the second heading signal ($S_b$) to be followed; and a first switch (11) connected between a first output of the receiver (7) and an output of the manual input circuit (9) and the second input of the track error computing circuit (8) to which the second heading signal ($S_b$) to be followed is applied.

3. Apparatus according to claim 2, further comprising a second switch (12) connected between a second output of the receiver (7) directly delivering the track error signal ($S_c$) and an output of the track error computing circuit (8) and the first input of the processing circuit (3).

4. Apparatus according to claim 3, wherein the track error generator circuit (4) generating the route error signal ($S_c$) comprises an operational mode selector (13) controlling the first and second switches (11, 12) and which is one of manually and automatically controlled as a function of validity of information issuing from the magnetic compass (6) and the receiver (7).

5. Apparatus according to claim 4, wherein the track error generator circuit (4) generating the track error signal comprises a control logic circuit (16) having a plurality of inputs (16a, 16b, 16c) connected to the operational mode selector (13) and to the receiver (7) and having an output connected to the low-frequency signal generator (5) so that the low-frequency signal generator (5) emits a plurality of characteristic signals as a function of signals emitted by the receiver (7) and upon a change of operational mode.

6. Apparatus according to claim 5, wherein the plurality of inputs of the control logic circuit comprise:

a first input (16a) connected to the mode selector (13) so as to provoke, upon an automatic change of operational mode, emission, by the low-frequency signal generator (5), of a signal characterizing the change of mode;

a second input (16b) connected to a third output (7a) of the receiver (7) emitting a signal characterizing a present state of the receiver (7); and a third input (16c) connected to a fourth output (7b) of the receiver (7) delivering a signal representing a distance from the rendezvous point.

7. Apparatus according to claim 1, wherein there is connected to the receiver (7) a manual entry circuit (14) allowing a manual entry into the receiver of geographical coordinates of one of a route and a rendezvous point (P).

8. Apparatus according to claim 1, wherein there is connected to the receiver (7) a radioelectric receiver (15) to allow download of geographical coordinates of a route point via a radioelectric data transmission.

9. Apparatus according to claim 1, wherein homing to a point (P) constituted by a radioelectric emission source periodically emitting a signal followed by a period of silence is possible, wherein the apparatus further comprises:

a radiocompass (17) worn on a user's head to detect the signal emitted at a determined time instant ($t_0$) by the radioelectric emission source and to furnish a first signal ($S_{cr0}$) characterizing a direction of the radioelectric emission source with respect to the orientation of the user's head;

a second computing element (18) for establishing a fixing ($S_{b1}$) of the radioelectric emission source at the determined time instant ($t_0$) by effecting the addition of the first signal ($S_{cr0}$) and the first magnetic heading signal ($S_a$) corresponding to the orientation of the user's head at the determined time instant ($t_0$); and a memory (19) connected to an output of the second computing element (18) to store the fixing ($S_{b1}$) of the radioelectric emission source at the determined time instant ($t_0$), an output of the memory (19) being connected to the second input of the track error computing circuit (8) which delivers the track error signal ($S_c$).

10. A direction-finding apparatus for determining a direction to be followed to reach a predetermined location, the apparatus comprising:

a headset having left and right earphones;

a compass outputting a compass heading signal corresponding to a direction being followed;

a first device for automatically providing a first heading signal corresponding to a direction that is to be followed and a derived track error signal corresponding to a difference between the direction that is to be followed and a derived track that is being followed;

a second device for providing a manual first heading signal;

a track error computing circuit having a first input connected to said compass and a second input receiving one of the first heading signal and the manual first heading signal, said track error computing circuit providing a computed track error signal representing a difference between the compass heading signal and one of the first heading signal and the manual first heading signal;

a signal generator for generating audio signals; and a processing circuit having a first input for receiving the audio signals from said signal generator and a second input for receiving one of the computed track error signal and the derived track error signal, said processing circuit having two outputs respectively connected to said left and right earphones so as to provide to the left and right earphones the audio signals that are differentiated as a function of the signal received on said second input, the differentiated audio signals providing a sound signal in said earphones that is perceived as coming from the direction that is to be followed.

* * * * *